TACAN REFERENCE BURST DECODER

Filed Nov. 18, 1966

INVENTORS
DWIGHT T. HOWARD
JAMES R. VERWEY
BY [signature] ATTY.

United States Patent Office 3,509,477
Patented Apr. 28, 1970

3,509,477

TACAN REFERENCE BURST DECODER

James R. Verwey and Dwight T. Howard, Monroe, N.Y., assignors to General Dynamics Corporation, a corporation of Delaware Filed Nov. 18, 1966, Ser. No. 595,491
Int. Cl. G01s *1/44;* H03k *5/18*
U.S. Cl. 328—155 8 Claims

ABSTRACT OF THE DISCLOSURE

A tacan reference burst decoder is described which synthesizes reference pulses which are synchronized with both the tacan reference and auxiliary pulse groups. A phase locked loop which responds to the received reference and auxiliary pulse groups includes counters which provide the synthesized reference pulses. The counters also generate gates which enable the storage of bits corresponding to the received reference pulse groups in a register. Logic responsive to the number of bits stored in the register conditions the decoder either into its acquisition or lock-on modes of operation.

The present invention relates to tacan (tactical air navigation) systems and particularly to a reference burst decoder which is useful in such systems.

The tacan beacon transmits a composite signal which includes north reference pulse groups and auxiliary reference pulse groups. These groups are distinguished from each other and from other signals by having a predetermined number of pulses in each group which have predetermined pulse spacings. Specifically, the north reference pulse groups comprise fifteen pulse groups per second, each group consisting of twelve pulse pairs spaced 30 microseconds apart, the natural frequency of the pulses in the group being 33.3 kc./s. The auxiliary reference pulse groups reoccur at the rate of 120 groups per second, each group consisting of 6 pulse pairs spaced 24 microseconds apart and having a natural frequency of 83.3 kc./s. In conventional tacan receivers, both the auxiliary and the north pulse groups are decoded from the received composite tacan system and used in the bearing indicating circuits of the tacan receiver. Tacan receivers are subject to bearing errors which result from false decoding of the reference pulse groups. Moreover, the decoding circuits are not accurate in determining the precise location of the pulse groups and both the auxiliary and the north reference pulse information must be utilized in the computation of bearing.

It is an object of the present invention to provide an improved reference burst decoder for tacan systems which derives reference burst information in a manner more accurate than prior tacan reference burst decoders.

It is a further object of the present invention to provide an improved tacan reference burst decoder which provides a single accurate reference pulse output which is a function of the information contained in both the north and auxiliary reference pulse groups.

It is a still further object of the present invention to provide an improved tacan burst decoder which is less susceptible to perturbations due to noise and other signals which might be present in the composite tacan signal.

Briefly described, a tacan burst decoder embodying the present invention includes a phase locked loop which generates pulses at the same repetition rate as the north reference bursts and the auxiliary reference bursts. The auxiliary reference bursts and the north reference bursts are translated into a train of pulses which is applied as one input to the phase detector in the loop. An error voltage is derived for controlling the phase of the pulses generated in the loop. The synthesized pulses which occur at 15 c./s. are synchronized with the north reference pulse groups through the use of information derived from both the auxiliary and north reference pulse groups which are received by the tacan receiver. Inasmuch as the phase locked loop is locked to the incoming reference bursts, noise and other irrelevant signals are rejected by the loop. Means may be provided whereby the loop is made to lock initially to one of the incoming reference groups, say the north reference, and then the higher frequency auxiliary reference is used to maintain phase lock. Specifically, a register may be provided. A bit of digital information generated by an amplitude detector from each north reference burst group is stored in the register in the event that it occurs in proper time relationship with the reference pulses which are synthesized by the loop. A gate generator generates a gate pulse for enabling the passage of the north reference bit into the register if it occurs in the proper time position. The bits stored in the register are continuously shifted through the register at the repetition rate of synthesized reference pulses (viz. 15 c./s.). In the event that a certain number, say at least one, north reference bit is stored in the register, the phase locked loop is conditioned to operate with the received auxiliary reference pulse groups which occur at the higher frequency. Should the register not have this certain number of bits stored therein, the decoder system is conditioned for acquisition and responds only to the north reference bursts.

The invention itself, both as to its organization and method of operation, as well as additional objects and advantages thereof will become more readily apparent from a reading of the following description in connection with the accompanying drawings in which.

Figures 1, 2, 3:
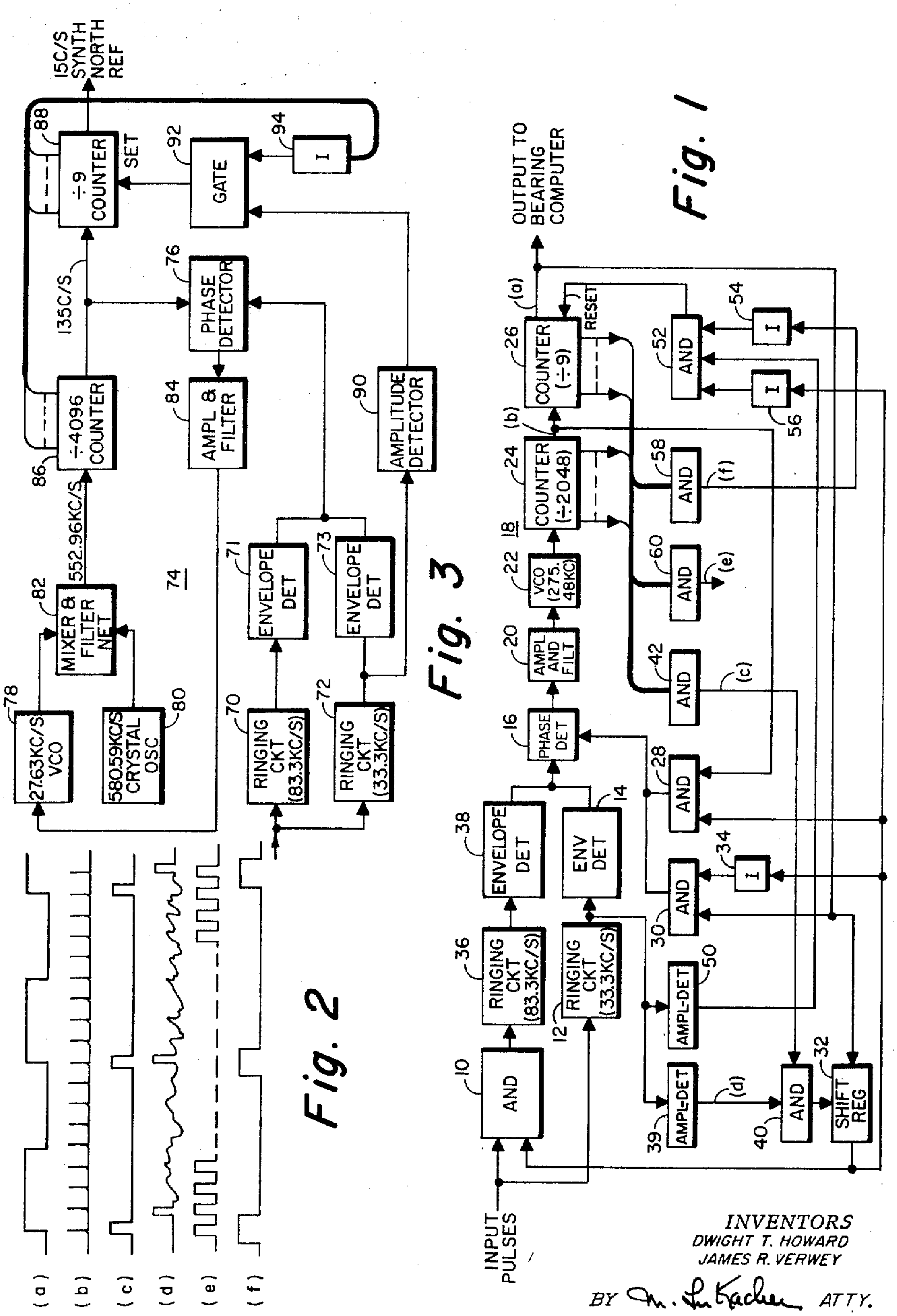
FIG. 1 is a block diagram of a tacan reference burst decoder embodying the invention.
FIG. 2 is a waveform diagram showing certain waveforms which occur in the system of FIG. 1 during its operation.
FIG. 3 is a block diagram of a tacan reference burst decoder in accordance with another embodiment of the invention.

Referring to FIG. 1, input pulses, which may be derived from the coincidence decoder of the tacan receiver, are applied as an input to an AND gate 10 and to a ringing circuit 12 which is tuned to 33.3 kc./s. which is the natural frequency of the pulses in the north reference pulse group. Accordingly, the north reference bursts are generated in the ringing circuit, which have a frequency of 33.3 kc./s. and which reoccur at 15 c./s. These bursts are translated into pulses by means of an envelope detector 14 which may, for example, be a diode detector. The envelope detector provides a first input to a phase detector 16 in a phase locked loop 18. The loop includes a DC amplifier and filter 20 which derives the DC error voltage from the phase detector and applies it as a frequency control signal to a voltage controlled oscillator 22. This oscillator may have a nominal frequency of 275.48 kc./s., and may have a variable reactance element such as a voltage variable capacitor diode which will change the frequency output thereof in accordance with the amplitude of the error voltage applied thereto. Other types of voltage controlled oscillators, such as multivibrator circuits may also be used.

The output of the oscillator 22 is applied to a counter 24 which may include a chain of flip-flops and which divides the frequency of the input signal applied thereto by 2,048. Of course, if the oscillator 22 is a sine wave oscillator, a pulse forming circuit is inserted between the output of the oscillator and the input of the counter in order to obtain driving pulses of the correct level once during each cycle of the oscillator output. By virtue of its division ratio, the counter 24 produces an output pulse train having a frequency of 135 c./s.

Another counter 26 is provided which receives the output pulses from the counter 24. The dividing ratio of this counter is nine such that a 15 c./s. pulse train is produced. The leading edge of the pulses in this train may be used to generate the synthesized north reference pulses and will be phase locked in the position of the north reference bursts. The synthesized north reference is applied as an input to the tacan bearing computer. The output of the counter 24 is applied as an input to an AND gate 28 and the output of the counter 26 is applied as an input to another AND gate 30. The gate 30 which passes to 15 c./s. pulse train is enabled during acquisition, while the other AND gate 30 is enabled after the loop is locked to the north reference pulses obtained from the envelope detector 14. Acquisition of the north reference pulse is indicated by an output level from a shift register 32, the operation of which will be described hereinafter. Prior to acquisition, the AND gate 30 is enabled inasmuch as the output level of the shift register is applied to the AND gate 30 through an inverter 34.

The auxiliary reference pulses will pass through the AND gate 10 after acquisition since the output level from the shift register, which indicates acquisition, is applied as an enabling input to the gate 10.

A ringing circuit 36 which is tuned to 83.3 kc./s. detects the auxiliary reference pulse groups. The bursts from the ringing circuits 36 are translated into pulses by an envelope detector 38 similar to the detector 14 and are applied conjointly with the north reference pulses to the phase detector. Thus, even after acquisition, the north reference pulses and the auxiliary reference pulse which are obtained from the tacan receiver are applied to the phase locked loop 18 and the phase locked loop locks at the average phase position thereof.

Acquisition is detected by generating a series of bits, each corresponding to a successive north reference pulse group. An amplitude detector 39 which may be a threshold circuit, which provides an output level in response to a burst produced by the ringing circuit 12, generates the north reference bit. This bit is gated through an AND gate 40 at such times as a gate pulse generated by the counters 24 and 26 is present. The timing of this gate pulse is the period that a north reference pulse is expected. An AND gate 42 which is enabled during the time that a certain range of pulses are counted by the counters 24 and 26 to generate this gate pulse. The inputs to the AND gate 42 may be the outputs of different flip-flop stages of the counters 24 and 26 which will be set when the requisite counts are stored in these counters 24 and 26.

The timing is indicated in the waveform diagram of FIG. 2. There, waveform (a) is the 15 c./s. pulse train which is generated at the output of the counter 26. Waveform (b) is the 135 c./s. output from the counter 24. Waveform (c) is the gate pulse which is derived from the AND gate 42 during the period that the counters 24 and 26 have stored therein counts which correspond to the expected time of occurrence of the leading edge of the 15 c./s. output (see waveform (a)). This gate pulse (c) is applied to the AND gate 40 and only permits the north reference bit (shown in wave form (d)) to be applied to the shift register input when it is coincident therewith. Pulses are shifted through the shift register by the leading edge of waveform (a). The shift register may have storage for four bits. Thus, if one north reference bit is stored in the shift register during four dwells (north reference pulse periods), the shift register will produce an output level indicating that the north reference pulse is present, which is tantamount to saying that the phase locked loop 18 has acquired or is substantially locked to the north reference pulse. Thereafter, 135 c./s. auxiliary reference pulses are permitted to be applied to the phase detector 16, via the AND gate 10, ringing circuit 36 and envelope detector 38. The loop is therefore locked to the average phase of the north and auxiliary reference pulses and the output to the bearing computer is exactly in phase with the received north reference pulses. The bearing computer therefore has sufficient information from the synchronized north reference pulse alone to compute the bearing of the tacan equipped aircraft.

If the north pulse fails to appear in the expected position after four dwells, the gate 10 will be inhibited and the auxiliary reference pulse will not be applied to the phase detector 16 until lock-on to the received north reference pulses is again obtained.

To hasten the initial lock-on to the north reference pulse, provision is made to allow a north reference pulse to synchronize the counter 26 even though the decoder is not locked to the north reference pulse. A north reference pulse which is used for this purpose should be of sufficient amplitude to distinguish it from noise or other tacan signals. To this end, an amplitude detector 50 having a higher amplitude threshold than the detector 39 is provided to derive a pulse from the north reference burst which is generated in the ringing circuit 12. This pulse is applied to an AND gate 52. The AND gate 52 will be inhibited by virtue of inverters 54 and 56 connected to other inputs thereof prior to lock-on by virtue of the output from the shift register 32. The gate 52 is also inhibited by a gate pulse which is generated by an AND gate 58 and applied thereto via the inverter 54, when the counters 24 and 26 store a range of counts corresponding to a time duration during which the north reference pulses are expected. These inhibiting pulses are shown in waveform (f) of FIG. 2. When enabled, the AND gate 52 resets the counter 26 so as to move the leading edge of the output from that counter to a position where it will be coincident with one of the auxiliary reference pulses. Such coincidence may occur when the counter 26 is reset to zero. Since the high amplitude north reference pulse derived by the detector 50 is then coincident with the leading edge of the counter 26 output, a lock-on to the north reference pulse may be assumed.

Another AND gate 60 produces a burst eliminate gate, as shown in waveform (e) for the duration of the reference bursts. This eliminate gate may be applied to the bearing computer so as to prevent the 15 c./s. and 135 c./s. information from being applied thereto during the reference burst period, thereby eliminating errors introduced by distortion of the 15 c./s. and 135 c./s. modulated signal which can introduce errors in the bearing computation.

FIG. 3, much like FIG. 1, utilizes a pair of ringing circuits 70 and 72 which receive inputs from the coincidence decoder output and provide north reference bursts and auxiliary reference bursts in response to the north reference pulse groups and the auxiliary reference pulse groups. These bursts are envelope detected by envelope detectors 71 and 73 similar to those used in the system of FIG. 1 and applied to a phase locked loop 74, as an input to the phase detector 76 thereof.

The phase locked loop 74 includes a voltage controlled oscillator 78 and a crystal oscillator 80, the outputs of which are heterodyned, and the difference frequency sideband product extracted by a mixer and filter network 82. The voltage controlled oscillator may be of the multivibrator type and is indicated as having a nominal output frequency of 27.63 kc./s. The error voltage derived by the phase detector is amplified and filtered in the circuit 84 and is applied to the voltage controlled oscillator 78 to vary the frequency and phase of the output thereof. The crystal oscillator 80 has an output frequency of 580.59 kc./s. Inasmuch as the crystal oscillator is significantly more stable than the voltage controlled oscillator, and since the difference mixer product of 552.96 kc./s. is used, the amount of introduced frequency error due to possible instability in the voltage controlled oscillator is reduced. The 552.96 kc./s. output is divided in a counter 86 to produce the 135 c./s. pulse train which is applied to the phase detector 76 to close the loop 74. The loop will therefore be locked to the average of the north and auxiliary reference bursts.

The 15 c./s. synthesized north reference pulse is obtained by dividing the 135 c./s. counter output by nine in another counter 88. In order to prevent ambiguities as to which of the 135 c./s. pulses corresponds in position to the north reference burst, an amplitude detector 90 derives a pulses from the north reference burst ringing circuit 72 each time a north reference pulse group occurs. This pulse is gated through a gate 92 and applied to set the divide by nine counter to zero. Thus, the divide by nine counter starts counting with each north reference burst and the output square wave therefrom will be synchronized with the north reference burst as well as being phase locked to the average frequency and phase of both the north and auxiliary reference bursts.

The gate 91 is enabled except when the north reference burst is expected by means of an inverter 94 which is connected to a cable in turn connected to the outputs of the stages of the counters 86 and 88, all of which will be of like polarity during the period when the north reference burst is expected. Of course, the logic for inhibiting the gate 92 during the north reference burst period is simplified by the showing merely of a single inverter for clarity of illustration. A plurality of inverters or gates for combining the outputs of the counters may, of course, be used .

From the foregoing description, it will be apparent that there has been provided an improved tacan reference pulse decoder system which is more accurate, and less susceptible to noise and distortion, than previous tacan reference burst decoders. Although preferred embodiments of the reference burst decoder have been described in order to clearly present the features of the invention, it will be apparent that variations and modifications of these embodiments within the scope of the invention will become apparent to those skilled in the art. Accordingly, the descriptions should be taken merely as illustrative and not in any limiting sense. Furthermore, the abstract of disclosure which is appended hereto, is provided solely for purposes of formal compliance with revised Rule 72 of the Rules of Practice, and should be construed as such.

What is claimed is:

1. A tacan reference burst decoder system for decoding received north reference and received auxiliary reference pulse groups to provide north reference pulses for use in a tacan bearing computer, said system comprising:

(a) means for generating a first pulse train in response to said received north reference pulse groups and a second pulse train in response to said received auxiliary reference pulse groups, (b) a phase locked loop for generating pulses having the same repetition rate as one of said received pulse groups which are in locked phase relationship with at least one of said first and second reference pulse trains, said loop including a phase detector, (c) means for applying both said first and said second pulse trains to said phase detector, and (d) means coupled to said loop and responsive to said generated pulses for providing said north reference pulses.

2. The invention as set forth in claim 1 including:

(a) data storage means, (b) means for storing bits corresponding to pulses in one of said trains to said storage means when they occur in predetermined time relationship with said synthesized reference pulses, and (c) means coupled to said storage means for conditioning said phase locked loop to receive only said one of said pulse trains when said storage means does not receive a certain number of bits over a predetermined number repetition of said synthesized reference pulses.

3. The invention as set forth in claim 1 including means responsive to pulses in one of said received pulse trains which are greater than a certain amplitude for conditioning said phase locked loop to provide an output coincident therewith.

4. The invention as set forth in claim 2 wherein said phase locked loop includes a voltage controlled oscillator and counter means for dividing the frequency of the output from said oscillator to provide said synthesized reference pulses.

5. The invention as set forth in claim 4 wherein said storage means is shift register, means for applying shift pulses to said register in response to the output pulses from said counter means, and means for storing bits in said shift register including an amplitude detector responsive to the amplitude of pulses in said one pulse train for generating bits, gating means connected to said counters for generating a gate pulse during the expected time of arrival of output pulses from said counter means, and means for enabling the application of said bits to said register during said gate pulse.

6. The invention as set forth in claim 5 wherein said means for generating the said first and said second pulse trains include a first ringing circuit tuned to the natural frequency of said north reference pulse groups and second ringing circuit tuned to the natural frequency of said auxiliary reference pulse group, a pair of envelope detectors coupled respectively to the output of said different ones of said ringing circuits for deriving the pulses of said first and said second pulse trains and applying said pulses to said phase locked loop phase detector, gating means coupled to the output of said shift register and enabled when said output occurs for passing input pulses to said second ringing circuit, and means for applying said input pulses continuously to said first ringing circuit.

7. The invention as set forth in claim 1 wherein said phase locked loop includes means for generating a signal which may be varied in frequency and means for dividing that signal in frequency to a frequency equal to the repetition rate of said second pulse train, wherein second frequency dividing means is responsive to the output of said first frequency dividing means for producing said synthesized pulses with a repetition rate equal to the repetition rate of said first pulse train, and wherein means responsive to said received north reference pulse groups are provided for resetting said second counter to a predetermined count whereby to synchronize said synthesized pulses with north reference pulse groups.

8. The invention as set forth in claim 7 wherein said signal generating means in said phase locked loop includes a voltage controlled oscillator and a crystal oscillator, said crystal oscillator having an output frequency much higher than said voltage controlled oscillator, and wherein said signal generating means also includes mixer and filter network means for deriving an output corresponding to the product of said voltage controlled oscillator and crystal oscillator outputs for application to the frequency dividing means in said phase locked loop.

References Cited

UNITED STATES PATENTS

| | | | |
|---|---|---|---|
| 2,838,673 | 6/1958 | Fernsler et al. | 329—122 |
| 2,924,822 | 2/1960 | De Faymoreau et al. | 343—106 |
| 2,930,842 | 3/1960 | Leyton | 328—155 |
| 2,938,205 | 5/1960 | Mandel | 343—106 |
| 3,163,823 | 12/1964 | Kellis | 328—155 |

JOHN S. HEYMAN, Primary Examiner

H. A. DIXON, Assistant Examiner

U.S. Cl. X.R.

343—106